(12) United States Patent
Steele (10) Patent No.: US 12,480,843 B2
(45) Date of Patent: Nov. 25, 2025

(54) GAS SAMPLING VALVE APPARATUS AND METHOD

(71) Applicant: Stratum Reservoir (US), LLC, Houston, TX (US)

(72) Inventor: Gavin Steele, White Heath, IL (US)

(73) Assignee: STRATUM RESERVOIR (US), LLC, Houston, TX (US)

( * ) Notice: Subject to any disclaimer, the term of this patent is extended or adjusted under 35 U.S.C. 154(b) by 110 days.

(21) Appl. No.: 18/682,792

(22) PCT Filed: Aug. 15, 2022

(86) PCT No.: PCT/US2022/040312
§ 371 (c)(1),
(2) Date: Feb. 9, 2024

(87) PCT Pub. No.: WO2023/019011
PCT Pub. Date: Feb. 16, 2023

(65) Prior Publication Data
US 2024/0344936 A1    Oct. 17, 2024

Related U.S. Application Data

(60) Provisional application No. 63/232,951, filed on Aug. 13, 2021.

(51) Int. Cl.
*G01N 1/22* (2006.01)

(52) U.S. Cl.
CPC ...................... *G01N 1/22* (2013.01)

(58) Field of Classification Search
CPC ............ G01N 1/22; G01N 2001/2238; G01N 1/2226; B05B 15/65; B65D 83/48; B65D 83/44
See application file for complete search history.

(56) References Cited

U.S. PATENT DOCUMENTS 3,234,707 A * 2/1966 Weston ................. B65B 31/003
53/88
3,285,288 A * 11/1966 Irwin ...................... F16K 27/07
251/293

(Continued)

FOREIGN PATENT DOCUMENTS

CN          107219073 A     9/2017
EP          0660026 B1      6/1995
(Continued)

OTHER PUBLICATIONS

European Patent Office; 22856703.8-1005/ 4384797 PCT/US2022040312; Extended European Search Report, Nov. 28, 2024.
International Search Report and Written Opinion for Application No. PCT/US2022/040312 dated Nov. 1, 2022.
International Search Report and Written Opinion of Application No. PCT/US2023/033349 dated Apr. 11, 2024.
European Patent Office, Appn 22856703.8-1005/4384797; PCT/US2022040312, European Search Report; Nov. 29, 2024.

*Primary Examiner* — Fatemeh Esfandiari Nia
(74) *Attorney, Agent, or Firm* — Morgan, Lewis & Bockius LLP (57) ABSTRACT

A valve assembly for a gas sampling apparatus. In one embodiment, the apparatus may comprise a valve body; a core valve, wherein a pin of the core valve the core valve is biased to a first, closed position; and a core valve carrier, wherein a body of the core valve carrier is biased to a first, closed position; wherein the pin of the core valve and the body of the core valve carrier may individually be displaced from their biased, first closed positions.

20 Claims, 7 Drawing Sheets

(56) References Cited

U.S. PATENT DOCUMENTS

| | | | |
|---|---|---|---|
| 4,173,895 A | 11/1979 | Pecor | |
| 4,535,802 A * | 8/1985 | Robertson | F16K 31/52408 |
| | | | 222/509 |
| 6,050,295 A * | 4/2000 | Meisinger | F16K 15/184 |
| | | | 137/543 |
| 7,387,134 B2 | 6/2008 | Moore et al. | |
| 8,740,237 B2 | 6/2014 | McAndrews et al. | |
| 8,960,222 B2 * | 2/2015 | Holbeche | F16K 17/048 |
| | | | 222/3 |
| 9,234,822 B2 | 1/2016 | Coleman et al. | |
| 9,983,103 B2 | 5/2018 | Coleman et al. | |
| 10,239,685 B2 | 3/2019 | Dann et al. | |
| 2012/0060941 A1 * | 3/2012 | Roman | F16K 3/246 |
| | | | 137/488 |
| 2014/0041753 A1 | 2/2014 | Beranger et al. | |
| 2019/0032789 A1 * | 1/2019 | Newman | F17C 13/04 |
| 2021/0190400 A1 | 6/2021 | Auyer et al. | |

FOREIGN PATENT DOCUMENTS

| | | |
|---|---|---|
| FR | 1327130 | 5/1963 |
| KR | 100817696 B1 | 3/2008 |
| WO | 2010135419 | 11/2010 |
| WO | 2016154269 A1 | 9/2016 |

* cited by examiner

GAS SAMPLING VALVE APPARATUS AND METHOD

CROSS-REFERENCE TO RELATED APPLICATIONS

This application claims priority to U.S. Provisional Application Ser. No. 63/232,951 filed Aug. 13, 2021, the entire contents of which is incorporated herein by reference thereto.

STATEMENT REGARDING FEDERALLY SPONSORED RESEARCH OR DEVELOPMENT

Not applicable.

BACKGROUND OF THE INVENTION

Field of the Invention

The present invention relates to the collection, transportation, and analysis of fluid samples which may be desired in various scientific, environmental, and resource contexts. More specifically, the present invention relates to pressurized container valves and valve actuating apparatuses and methods.

Background of the Invention

Pressurized gas sampling containers may be commonly used in the collection, transportation and analysis of gas samples which may be required in various scientific, environmental and resource contexts. The oil and gas industry may provide an exemplary context in which to examine the need for collecting, transporting and analyzing fluid samples. The details and operation of a gas sampling apparatus are described in U.S. Pat. Nos. 9,983,103 and 9,234,822, the entire contents of which are incorporated herein by reference thereto.

In oil and natural gas exploration, drilling, recovery and storage, periodic sampling of recovered gases and fluids may be required for subsequent analysis. For example, the term "mud" may be used as a colloquial term for a thick chemical composition that is pumped into drills as they penetrate the substrate. This "mud" may be subsequently returned to the surface and may contain gases that are released from the rock as the drill penetrates through a geological formation. Significant data of interest may be acquired by analyzing these gases. Separately, in the context of natural gas storage, large underground storage deposits may often be chemically tagged for later identification.

The apparatus and methods disclosed herein may improve the methods through which collection, transportation, and analysis of samples from these exemplary industrial applications may be performed, providing benefits in the process of obtaining such drilling data or identifying such chemical tags. The apparatus and methods may have suitable application across a number of industries beyond oil and gas.

BRIEF SUMMARY OF SOME OF THE PREFERRED EMBODIMENTS

The embodiments disclosed herein may comprise a valve assembly for a gas sampling apparatus. In one embodiment, the apparatus may comprise a valve body; a core valve, wherein a pin of the core valve the core valve is biased to a first, closed position; and a core valve carrier, wherein a body of the core valve carrier is biased to a first, closed position; wherein the pin of the core valve and the body of the core valve carrier may individually be displaced from their biased, first closed positions.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
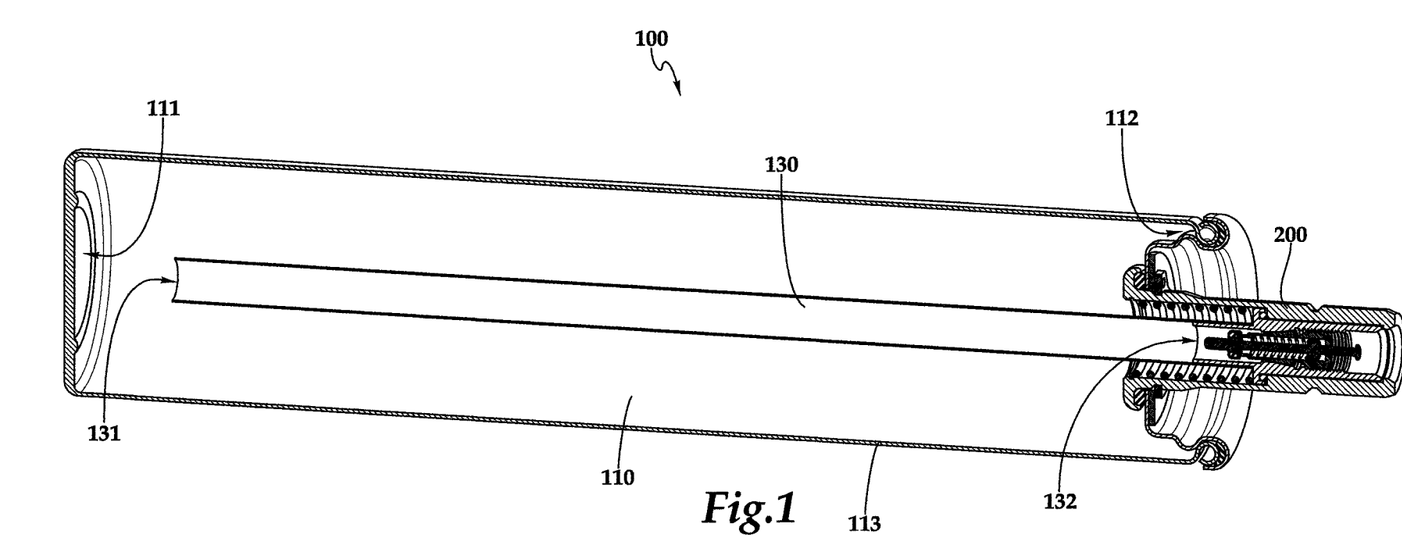
FIG. 1 illustrates an isometric view of an embodiment of a gas sampling container.
Figure 2:
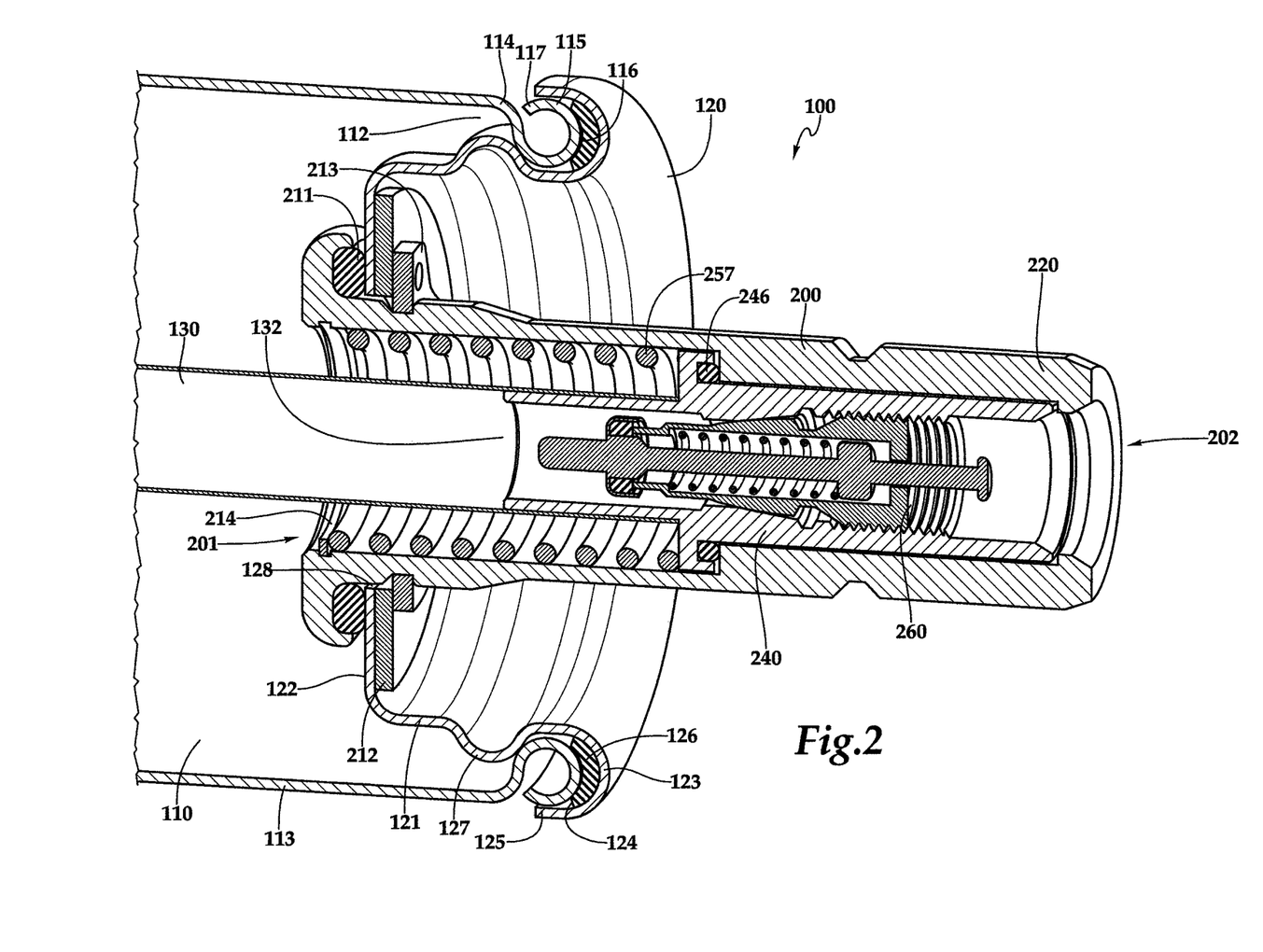
FIG. 2 illustrates an isometric view of an embodiment of a gas sampling container cap and valve assembly.

FIGS. 1 and 2 illustrate an embodiment of fluid container 100, comprising container body 110 having closed first end 111 and open second end 112, cap 120, dip tube 130, and valve assembly 200.

Container body 110 may comprise container wall 113 which may extend from closed first end 111 toward second open end 112. In embodiments, open second end 112 may comprise rolled lip 114 formed by container wall 113 being formed inward toward the longitudinal midline of container body 110 then outward to such an extent that container wall 113 touches itself at point 115, thus forming rolled lip 114 having outer curved surface 116.

Cap 120 may be cup shaped and formed having a diameter such that cap sides 121 may communicate with rolled lip 114 while allowing cap bottom 122 to slide within container body 110, allowing partially rolled flange 123 to also communicate with rolled lip 114. Partially rolled flange 123 may be formed in such a way as to allow inner curved surface 124 to communicate with outer curved surface 116 of rolled lip 114. Cap 120 may further comprise aperture 128 which may be adapted to receive valve assembly 200.

Container body 110 and cap 120 may be composed any substance of suitable strength for containing compressed or pressurized gasses or liquids. In embodiments, container body 110 or cap 120 may be formed of any suitable metallic or non-metallic material, for example aluminum, steel, or other suitable materials.

One or more sealing elements 126 may be disposed between inner curved surface 124 and outer curved surface 116 of rolled lip 114. Each of the one or more sealing elements 126 may be annular in shape and rest on inner curved surface 124, such that when cap 120 is fully inserted into container body 110, partially rolled flange 123 may communicate with the one or more sealing elements 126, which in turn may communicate with outer curved surface 116 of rolled lip 114, forming an air or gas tight seal. Partially rolled flange 123 may then be rolled or crimped, which may cause flange end 125 to be pressed under rolled lip 114 at point 117. This may tightly compress the one or more sealing elements 126, which may allow fluid container 100 to be so tightly sealed as to allow fluid container 100 to contain compressed or pressurized gasses or liquids. In an alternate crimping method, a portion of cap sides 121 may be expanded into cap side lip 127 such that cap side lip 127 may apply pressure under rolled lip 114, which may further enhance the ability of fluid container 100 to contain compressed or pressurized gasses or liquids.

Dip tube 130 may be substantially tubular, and may be formed having an outer diameter and inner diameter which may allow dip tube second end 132 to be secured to core carrier first mating portion 243 when fluid container 100 is configured in an operable state. Dip tube second end 132 may be secured to core carrier mating portion 243 through any suitable means. For example, dip tube second end 132 may be secured to core carrier mating portion 243 through a press-fit connection, a crimped connection, a threaded connection, a barbed connection, a swaged connection, other suitable connection, or combinations thereof. Dip tube 130 may be formed having a length which allows dip tube 130 to be disposed within fluid container 100 when fluid container 100 is configured in an operable state which provides sufficient clearance between dip tube first end 131 and container body closed first end 111 to allow fluid communication between an inner surface and an outer surface of dip tube 130 and vice-versa.

FIG. 2 further illustrates an embodiment of valve assembly 200, wherein valve assembly 200 may comprise valve body 220, core carrier 240, and core valve 260. As shown in FIG. 2, valve assembly 200 having first end 201 and second end 202 may be received by aperture 128 of cap 120 and secured in place having one or more sealing elements 211 disposed between valve body flange 221 and a first surface of cap bottom 122, and washer 212 disposed between retaining ring 213 and a second surface of cap bottom 122 as shown, such that valve assembly first end 201 is interior to fluid container 100 and valve assembly second end 202 is exterior to fluid container 100 when fluid container 100 is configured in an operable state. Each of the sealing elements 211 may be any suitable sealing element, for example an O-ring, and may be formed from any suitable material, for example, nitrile rubber, viton, silicone, or any suitable elastomer. In embodiments, washer 212 and retaining ring 213 may be formed of suitable metallic or non-metallic material, for example stainless steel, steel, or other suitable material.

Figure 3:
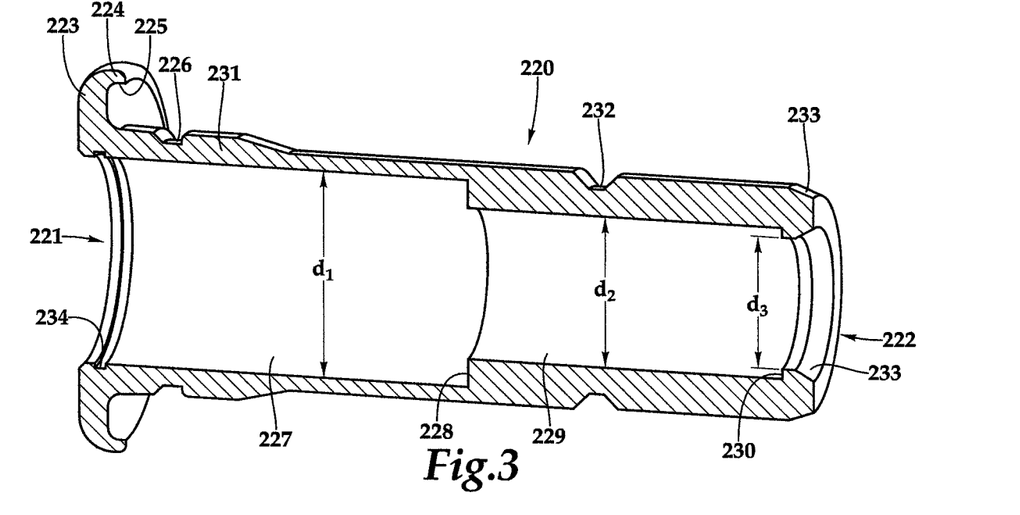
FIG. 3 illustrates an isometric view of an embodiment of a valve body.

As shown in FIG. 3, valve body 220 may be formed having a central bore extending between first end 221 and second end 222, and may be formed of any suitable metallic or non-metallic material, for example aluminum. Valve body 220 may comprise flange 223 at first end 221 which may be partially rolled, forming lip 224 having an inner surface 225 which may communicate with the one or more sealing elements 211, which in turn may communicate with the first surface of cap bottom 122. Valve body 220 may be provided with outer recessed profile 226 which may receive retaining ring 213, wherein outer recessed circumferential profile 226 may be located about first end 221 such that when retaining ring 213 is fully seated, retaining ring 213 may communicate with washer 212 which in turn may communicate with the second surface of cap bottom 122. In this manner retaining ring 213 may cause valve body 220 to be biased outwardly relative to fluid container 100, thus compressing the one or more sealing elements 211 against the first surface of cap bottom 122, forming the air or gas tight seal. The central bore of valve body 220 may be formed having first internal diameter $d_1$ and uniform internal surface 227 extending from open first end 221 to first internal shoulder 228, and second internal diameter $d_2$ and uniform internal surface 229 extending from first internal shoulder 228 to second internal shoulder 230, and third internal diameter $d_3$ extending from second internal shoulder 230 to open second end 222. In embodiments, first internal diameter $d_1$ may be greater than second internal diameter $d_2$, and second internal diameter $d_2$ may be greater than third internal dimeter $d_3$. Valve body 220 may comprise an enlarged outer diameter portion 231, adapted to provide outer recessed profile 226, which may reduce to a uniform outer diameter extending toward second end 222. Valve body 220 may be provided with outer recessed circumferential profile 232 which may be located about a middle portion of valve body 220 located longitudinally between first internal shoulder 228 and second internal shoulder 230. Valve body second end 222 may further comprise one or more chamfered surfaces 233. Internal surface 227 may be provided with recessed internal profile 234 about first end 221 which may be adapted to receive retaining ring 214.

Figure 4:
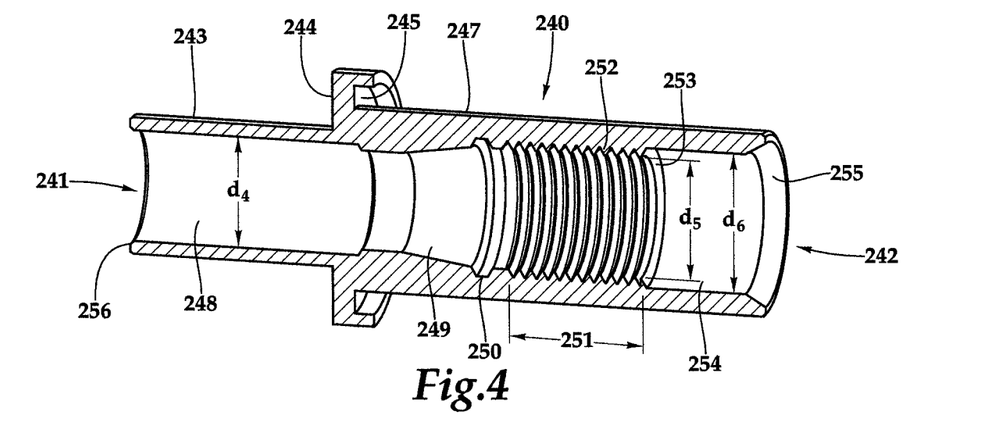
FIG. 4 illustrates an isometric view of an embodiment of a core carrier.

As shown in FIG. 4, core carrier 240 may be formed having first end 241 and second end 242. Core carrier 240 may be formed of any suitable metallic or non-metallic material, for example aluminum. Core carrier 240 may be formed having mating portion 243 extending from first end 241 to external shoulder 244, with mating portion 243 having an outer diameter adapted to receive dip tube 130. External shoulder 244 may be formed having seal seat 245 as shown, which may be adapted to receive one or more sealing elements 246 disposed between seal seat 245 and valve body internal shoulder 228, as shown in FIG. 2. Core carrier 240 may be formed with outer surface 247 extending from seal seat 245 to second end 242, and having an outer diameter which allows core carrier 240 to form an annular gap between core carrier outer surface 247 and valve body inner surface 229 when configured in an operable state.

Biasing element 257, shown in FIG. 2, may be compressed between retaining ring 214 and external shoulder 244, which may bias core carrier 240 into a first closed position having sealing element 246 compressed between seal seat 245 and external shoulder 244. In this manner, core carrier 240 may be biased to communicate with sealing element 246, which in turn may communicate with external shoulder 244, forming an air or gas tight seal. Biasing element 257 may be any suitable biasing element capable of biasing core carrier 240 into a first closed position under vacuum, for example, biasing element 257 may be a spring. Biasing element 257 may be formed of any suitable metallic material, for example steel. Each of the sealing elements 246 may be any suitable sealing element sufficient to prevent fluid communication through the annular gap between valve body 220 and core carrier 240, for example an O-ring, and may be formed from any suitable material, for example, nitrile rubber, viton, silicone, or any suitable elastomer.

Core carrier 240 may be formed having a central bore extending from first end 241 to second end 242. Mating portion 243 may be formed having an internal diameter $d_4$ (shown on FIG. 2) and uniform internal surface 248 which may extend from first end 241 to core carrier valve seat 249. Core carrier valve seat 249 may be formed having a reduced internal diameter which may expand conically in a longitudinal direction traversing from first end 241 toward second end 242 in a manner adapted to receive core valve seat 272. Core valve seat 272 may abut internal recessed profile 250, which may abut internal surface 252 having diameter $d_5$ (shown in FIG. 2). Internal surface 252 may be formed having internal threads 251 which may be adapted for threadable connection with corresponding external threads 274 of core valve 260. Internal shoulder 253 may be formed having a profile adapted to contact a first surface of chuck body mating portion 326, which will be described later, expanding to internal surface 254 having internal diameter $d_6$ (shown in FIG. 2) which may be adapted to receive chuck mating portion 326. The central bore of core carrier 240 may terminate at second end 242 having chamfered surface 255 which may adapt internal diameter $d_6$ to internal dimeter $d_3$ of valve body 220. In embodiments, mating portion 243 may be formed having one or more chamfered surfaces at first end 241.

Figure 5:
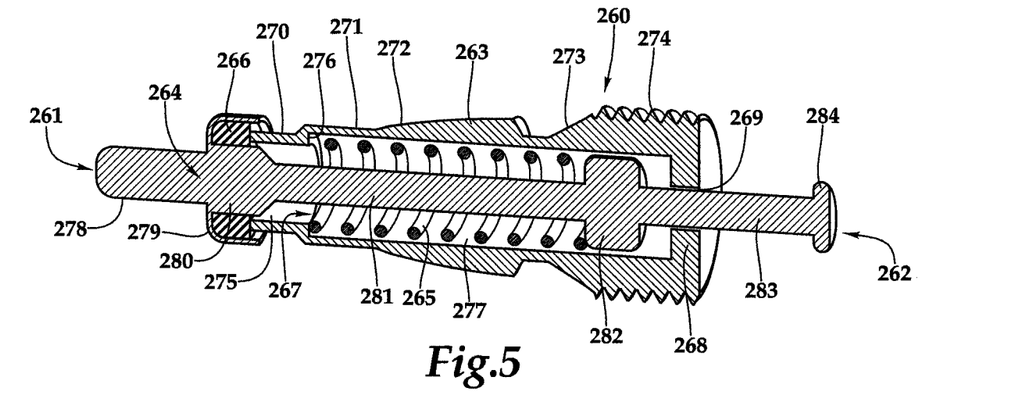
FIG. 5 illustrates an isometric view of an embodiment of a core valve.

As shown in FIG. 5, core valve 260 may comprise first end 261 and second end 262, and may further comprise core valve body 263, core pin 264, biasing element 265, and sealing element 266.

Core valve body 263 may be formed from one or more components, and may be formed of any suitable metallic or non-metallic material, for example brass. Core valve body 263 may provide central cavity 267 which may result from a central bore extending from a first end of valve body 263 toward wall 268 disposed at a second end of valve body 263. Wall 268 may comprise aperture 269 located about a central axis of valve body 263, which may be adapted to receive a portion of core pin 264. Core valve body 263 may be formed having an outer surface comprised of a number of segments, each varying in diameter and/or profile. As illustrated in the embodiment shown in FIG. 5, first segment 270 may extend from a first end of valve body 263 and abut second segment 271, and may have a uniform outer diameter. Second segment 271 may extend from first segment 270 and abut third segment 272, and may have a uniform outer diameter larger than the diameter of first segment 271. Third segment 272, also referred to as core valve seat 272, may extend from second segment 271, with a conical shape increasing in diameter in a direction traversing from second segment 271 toward fourth segment 273, which may exhibit a profile complimentary to, and adapted to be received by, core carrier valve seat 249, and which may prevent fluid communication between the external surface of core valve 260 proximal to third segment 272 and the internal surface of core carrier 240 at core carrier valve seat 249. In embodiments, one or more core body seals (not shown) may be disposed between core body valve seat 272 and core carrier valve seat 249, conforming to the profile of core carrier valve seat 249. Each of the one or more core body seals may be formed from any suitable material, for example Teflon® which is a registered trademark of The Chemours Company FC, LLC, and may prevent fluid communication between core carrier valve seat 249 and core body valve seat 272. Traversing longitudinally from third segment 272 toward fifth segment 274, fourth segment 273 may first exhibit a sharp reduction in outer diameter which may be conical in shape, which may be followed by a segment of uniform outer diameter, which may be followed by a final segment which may exhibit a conical shape increasing in diameter. The maximum diameter of fourth segment 273 may correspond to diameter $d_5$ of core carrier 240. The outer surface profile of segment 273 may compliment inner recessed profile 250 of core carrier 240 in a manner which may prevent fluid communication between a first end and a second end of fourth segment 273. Fifth segment 274 may be formed to allow core valve body 260 to threadably engage complimentary internal threads 251 of core carrier 240. Cavity 267 may be formed having an internal profile comprised of a number of segments. First segment 275 may extend from a first end of core valve body 263 and abut internal shoulder 276, and may have a uniform internal diameter. Shoulder 276 may be formed at a longitudinal location corresponding to a transition from outer surface first segment 270 to outer surface second segment 271, and may provide a surface sufficient to engage a first end of biasing element 265. Second segment 277 may extend from shoulder 276 throughout the remainder of cavity 267, abutting an internal surface of wall 268, and may exhibit a uniform internal profile adapted to receive biasing element 265.

Core pin 264 may be formed from one or more components, and may be formed of any suitable metallic or non-metallic material, for example brass. Core pin 264 may comprise a number of segments. Traversing longitudinally, core pin 264 may comprise first segment 278 which may have an enlarged outer diameter and may extend from core pin first end 261 and abut flange 279. Flange 279 may be formed to be partially rolled, providing a lip having an inner surface which may provide a seat for, and communicate with, sealing element 266. Flange 279 may comprise an outer diameter greater than the outer diameter of core valve body first segment 270, allowing sealing element 265 to communicate with core valve body 263, providing an air or gas tight seal. Second segment 280 may be sized to provide an annular space between second segment 280 and the lip of flange 279 sufficient to securely seat sealing element 265, and may have a maximum outer diameter smaller than that of core valve body internal segment 275. Second segment 280 may exhibit an outer profile conical in shape and reducing in diameter to abut third segment 281. Third segment 281 may exhibit a uniform outer surface extending from second segment 280 to abut fourth segment 282. Fourth segment 282 may be formed having an enlarged outer diameter adapted to remain in slidable contact with core valve body inner surface 277, and may be sized about its longitudinal axis such that it is positioned away from wall 268 when sealing element 266 is fully seated against core valve body 263. The fifth segment 283 of core pin 264 may be formed having an outer diameter adapted to be received into core valve body aperture 269, while providing an annular gap between fifth segment 283 and aperture 269 sufficient to provide a desired level of fluid communication through the annular gap. Fifth segment 283 may extend to abut cap 284, which may act as a stop to prevent core pin 264 from fully entering valve body 263.

Biasing element 265 may be compressed between core valve body internal shoulder 276 and core pin fourth segment 282, which may bias core valve 260 into a first, or closed, configuration having sealing element 266 compressed between an interior surface of flange 279 and a first end of core valve body 263. In this manner, the interior surface of flange 279 may be biased to communicate with sealing element 266, which in turn may communicate with the first end of core valve body 263, forming an air or gas tight seal. Biasing element 265 may be any suitable biasing element capable of biasing core pin 264 into a first closed position under vacuum, for example, biasing element 265 may be a spring. Biasing element 265 may be formed of any suitable metallic material, for example stainless steel. Sealing element 266, which may also be referred to as core gasket 266, may be any suitable sealing element sufficient to prevent fluid communication through core valve body 263 when in a fully seated configuration, and may be formed from any suitable material, for example Teflon®, nitrile rubber, viton, silicone, or any suitable elastomer.

Figure 6:
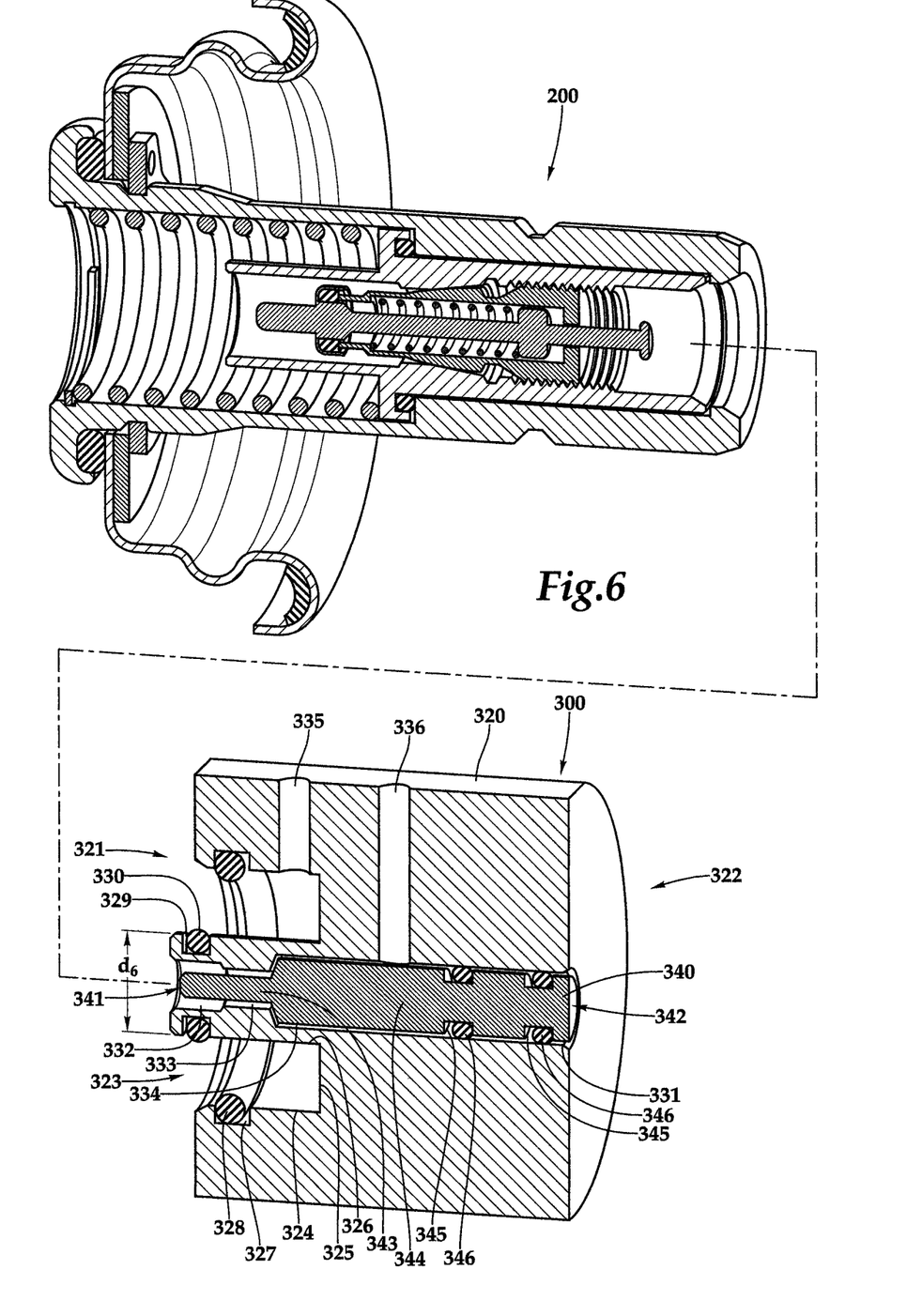
FIG. 6 illustrates an isometric view of embodiments of a valve assembly and a chuck.

FIG. 6 illustrates valve assembly 200 and chuck 300, which may comprise chuck body 320 and chuck pin 340 in an operable configuration as shown. In embodiments, chuck 300 may comprise additional aspects beyond those shown in FIG. 6.

Chuck body 320 may be formed from one or more components and may comprise first end 321 and second end 322. Chuck body first end 321 may be adapted to receive valve assembly 200, comprising valve seat 323 which may be formed having radial sidewall 324, back surface 325, and mating projection 326. Mating projection 326 may comprise an outer diameter corresponding to core carrier inner diameter do, and may be sized such that when the first end of mating projection 326 is in resting contact with core carrier internal shoulder 253 there is provided a gap between the second end of valve assembly 200 and valve seat back surface 325. The first end of mating projection 326 may be provided with one or more chamfered surfaces. Radial sidewall 324 may be sized having a diameter greater than the outer diameter of the second end 202 of valve assembly 200. As shown, radial sidewall 324 may provide one or more recessed inner profiles 327 having one or more sealing elements 328 disposed therein. Similarly, mating projection 326 may provide one or more recessed outer profiles 329 having one or more sealing elements 330 disposed therein. Each of the one or more sealing elements 328,330 may be any sealing element suitable which may prevent fluid communication across an external surface of mating projection 326 (in the case of sealing element 328) or across and interior surface of radial sidewall 324 (in the case of sealing element 330). In embodiments, sealing element 328,330 may be any suitable sealing element, for example, an O-ring, and may be formed from any suitable material, for example, nitrile rubber, viton, silicone, or any suitable elastomer.

Chuck body 320 may be provided with central bore 331 extending from chuck body first end 321 through at least chuck body second end 322, which may be adapted to receive chuck pin 340. The internal profile of central bore 331 may be comprised of a number of segments, each varying in diameter and/or profile. Traversing longitudinally, first segment 332 may be provided with a uniform internal surface which may extend from chuck body first end 321 to abut second segment 333. Second segment 333 may be formed having a uniform internal surface of a diameter smaller than that of first segment 332, and may extend to abut third segment 334. Third segment 334 may be formed having a diameter greater than that of first segment 332 and may be provided with a uniform internal surface.

Chuck body 320 may also be provided with one or more outlet bores 335 and one or more inlet bores 336. Each of the one or more outlet bores 335 may allow fluid communication between an inner surface of valve seat 323 through chuck body 320. Similarly, each of the one or more inlet bores 336 may allow fluid communication between an annular gap formed between an outer surface of central bore 331 and through chuck body 320.

Chuck pin 340 may have first end 341 and second end 342, and may be formed having an outer profile which may comprise a number of segments. First segment 343 may be formed having a diameter sized to allow first segment 343 to pass through second segment 333 of chuck body central bore 331 while providing an annular gap between the outer surface of first segment 343 and central bore 331. First segment 343 may extend from a first end of chuck pin 340 to abut second segment 344, transitioning to second segment through a conical shape expanding radially when traversing longitudinally toward second segment 344. Second segment 344 may be formed having an outer diameter which may provide an annular gap between an outer surface of second segment 344 and an inner surface 334 of chuck body central bore 331. Second segment 344 may be provided with one or more recessed outer profiles 345 having one or more sealing elements 346 disposed therein. Each of the one or more sealing elements 346 may be any suitable sealing element which may prevent fluid communication through the annular gap formed between the internal surface of chuck body central bore 331 and an external surface of chuck pin 340, and may be disposed in a location which may allow fluid communication between the annular gap and the one or more inlet bores 336. In embodiments, chuck pin 340 may be modulated between a first and second position. In alternate embodiments, the modulation of chuck pin 340 may be performed locally via mechanical componentry or remotely via actuation employing solenoid componentry or other suitable means.

Figure 7:
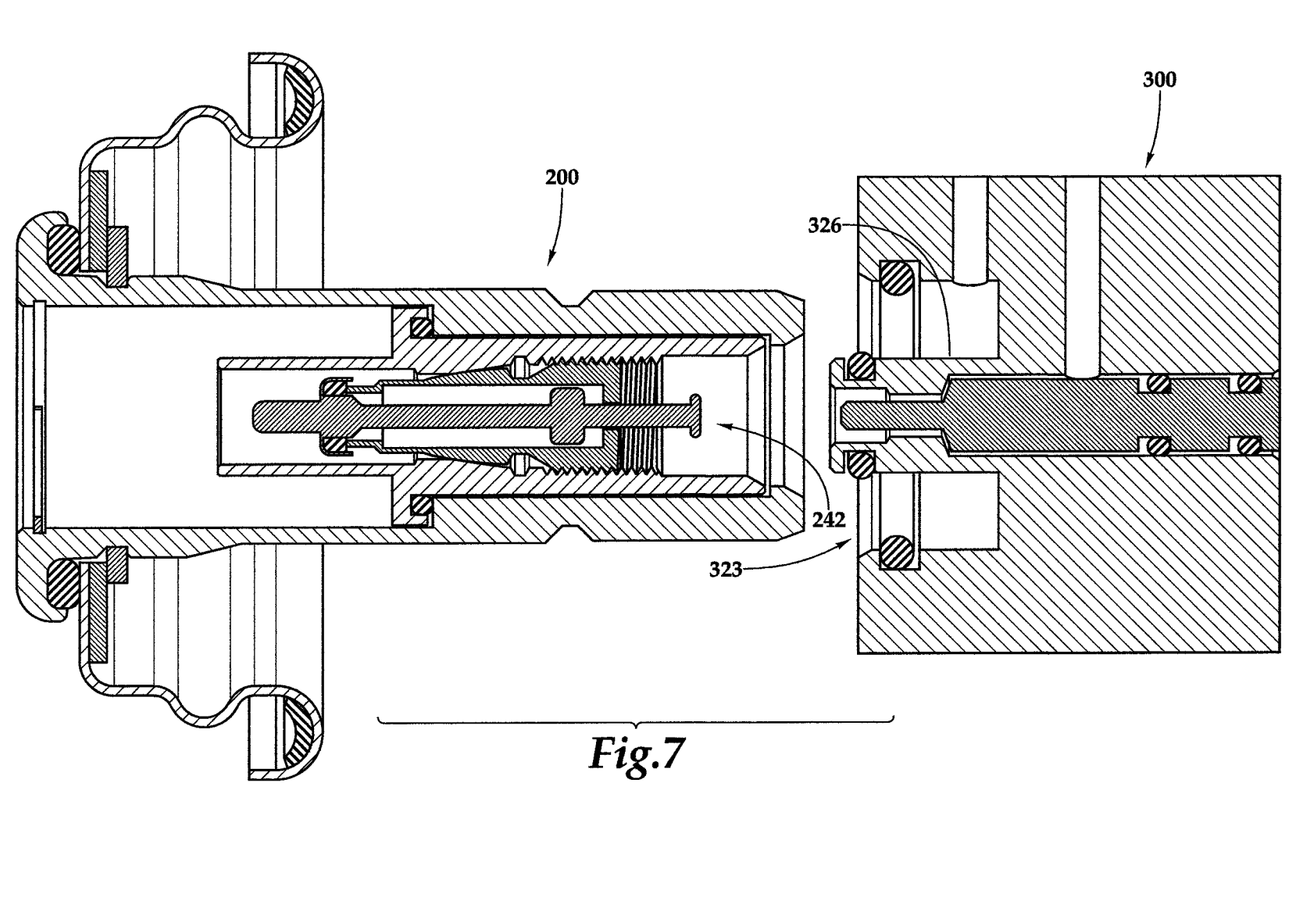
FIG. 7 illustrates a cross-sectional view of an embodiment of a gas sampling valve assembly and chuck in an unseated configuration.
Figure 8:
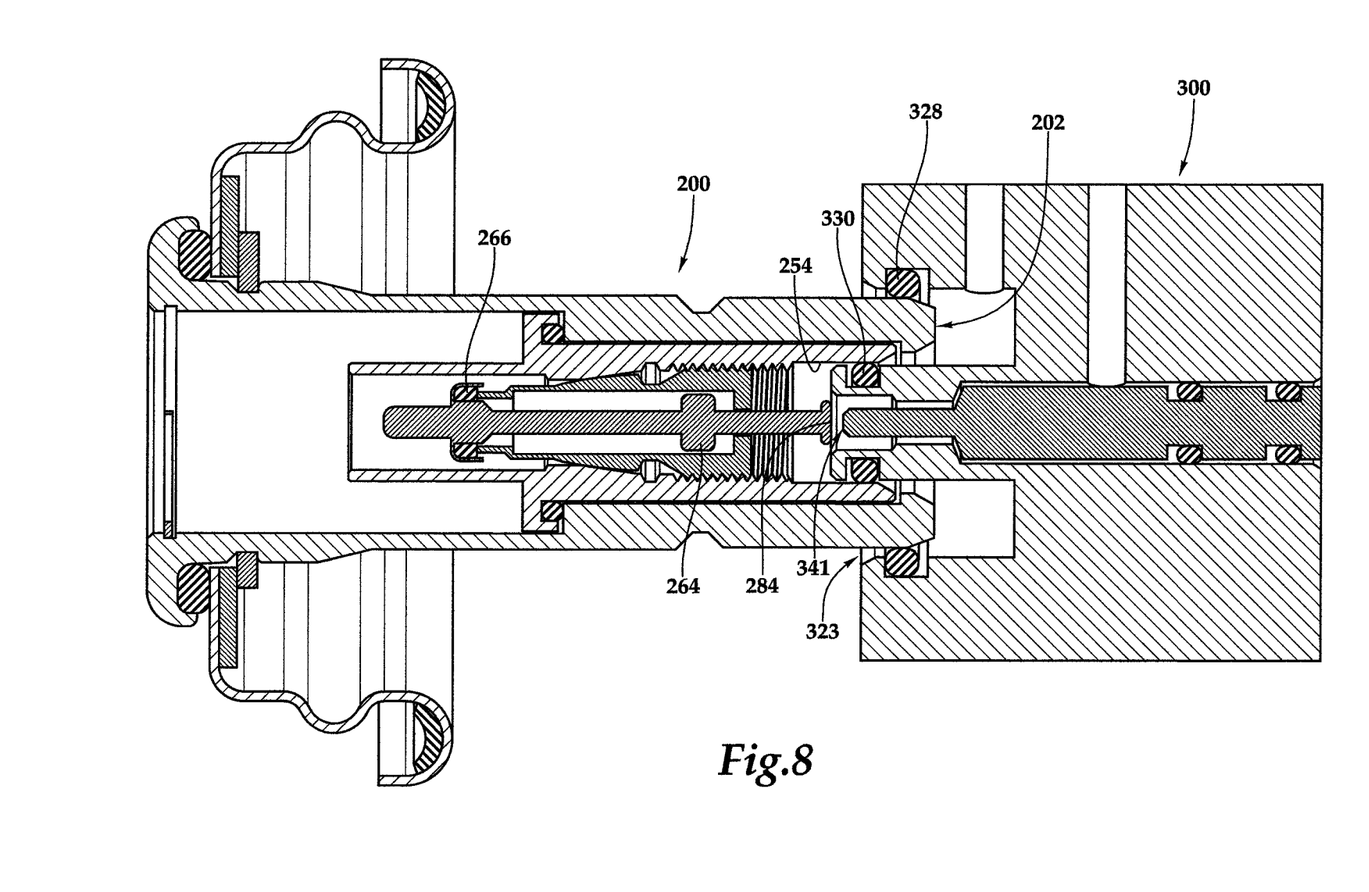
FIG. 8 illustrates a cross-sectional view of an embodiment of a gas sampling valve assembly and chuck in a partially seated configuration.
Figure 9:
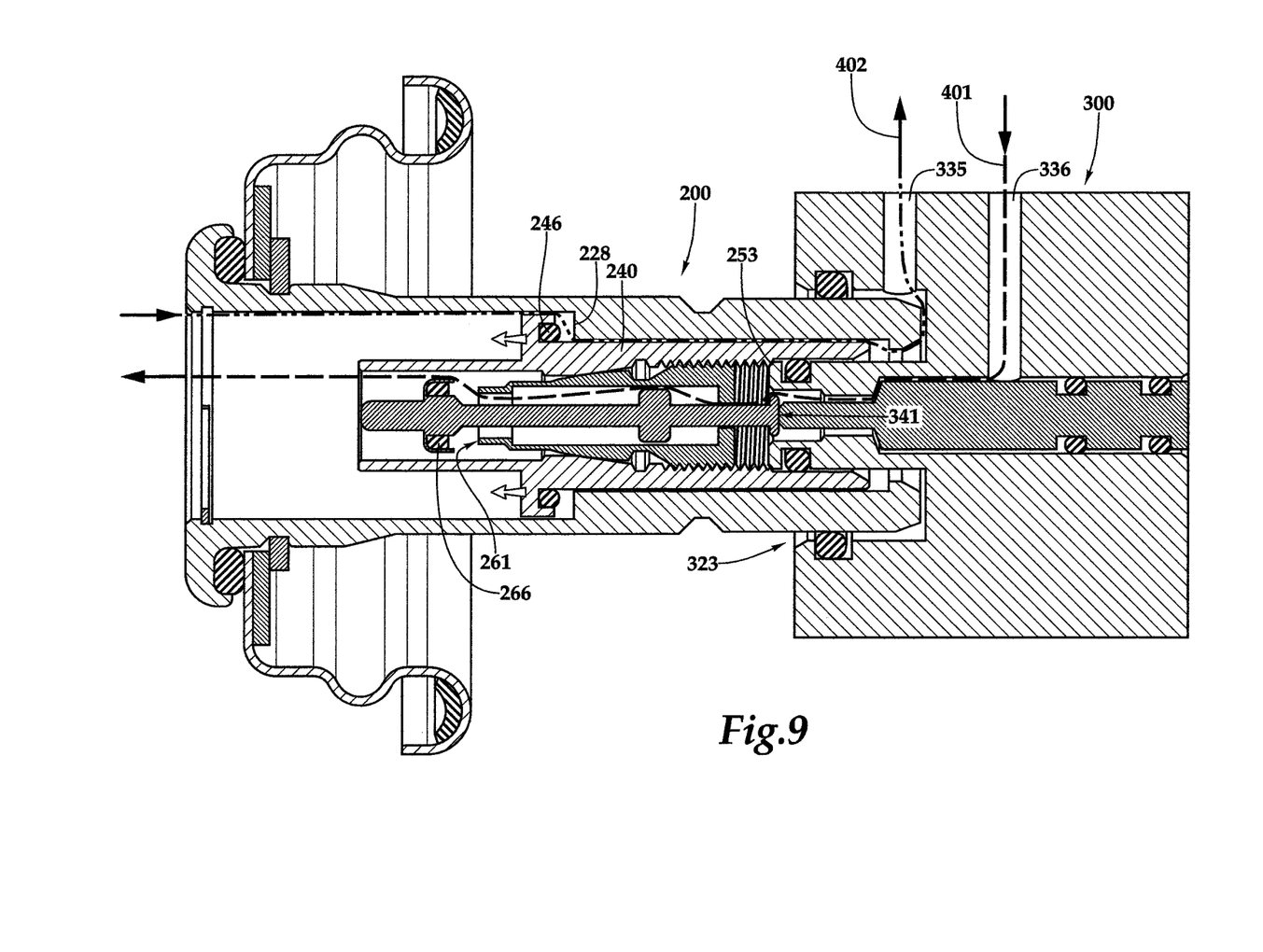
FIG. 9 illustrates a cross-sectional view of an embodiment of a gas sampling valve assembly and chuck in a fully seated configuration.

FIGS. 7-9 illustrate an embodiment of fluid container 100 under exemplary operational conditions, wherein FIG. 7 illustrates valve assembly 200 in an unseated configuration, and FIGS. 8 and 9 illustrate valve assembly 200 in partial and fully seated configurations, respectively, which will now be described.

As shown in FIG. 8, under operational conditions, valve assembly 200, being disposed at container second end 112, may be inserted into chuck body valve seat 323 which may progress through a number of intermediate seating positions until becoming fully seated. As valve assembly 200 begins to be transitioned toward a fully seated configuration, mating projection 326 may be introduced into core carrier second end 242 with sealing element 330 of chuck body mating projection 326 slidably engaging core carrier internal surface 254 and sealing element 328 of chuck body 320 slidably engaging an outer surface of valve assembly second end 202. In embodiments, the engagement of sealing elements 326,328 against surfaces 252,202 may occur progressively or simultaneously.

At a first intermediate seating position, chuck pin first end 341 may engage core pin second end 262 at cap 284. In this manner, as valve assembly 200 continues to be transitioned toward a fully seated configuration, chuck pin 340 may cause core pin 264 to be displaced from its first, biased closed position, in turn unseating sealing element 266 from core valve body first end 261, which in turn may allow inward fluid communication between core body inlet bore 336, the annular gap between core pin 240 and core body internal surfaces 334,333,332, core valve cavity 267, and dip tube 130 as illustrated in FIG. 9 as flow path 401.

At a second intermediate seating position, a first end of mating projection 326 may engage core carrier internal shoulder 253. In this manner, as valve assembly 200 continues to be transitioned toward a fully seated configuration, mating projection 326 may cause core carrier 240 to be displaced from its first, biased position, in turn unseating sealing element 246 from valve body internal shoulder 228, which in turn may allow outward fluid communication between the annular volume of container body 110, the annular gap between valve body internal surface 229 and outer surface of core carrier outer surface 247, valve body second end 202, a gap formed between valve body second end 202 and valve seat back surface 325, and core body outlet bore 335 as illustrated in FIG. 9 as flow path 402.

Valve assembly 200 may then continue to be transitioned toward a fully seated configuration. In the fully seated configuration, valve body second end 202 may come into resting contact against valve seat back surface 325, which may prevent fluid communication between valve body second end 202 and valve seat back surface 325. Additionally, in the fully seated configuration chuck pin 340 may be in communication with core pin 264, allowing core pin 264 to be modulated between a first, biased closed position and a second open position.

During removal of container 100 from chuck 300, the process just described may be reversed, whereby core carrier 240 may be returned to its first, biased closed configuration at a first intermediate unseating position, in turn re-seating and thus suspending fluid communication past sealing element 246, and core pin 264 may be returned to its first, biased closed configuration at a second intermediate unseating position, in turn re-seating and this suspending fluid communication past sealing element 266.

Although the present invention and its advantages have been described in detail, it should be understood that various changes, substitutions and alterations may be made herein without departing from the spirit and scope of the invention as defined by the appended claims.

What is claimed is:

1. A valve assembly for a gas sampling apparatus, comprising:
    a valve body;
    a core carrier, wherein the core carrier is biased toward a core carrier closed position; and
    a core valve comprising a core valve body and a core pin, wherein the core pin is biased toward a core pin closed position;
    wherein the core carrier and the core pin are individually displaced from their closed positions upon the valve assembly being seated in a chuck, thereby allowing a fluid to flow through the valve assembly.

2. The valve assembly of claim 1, wherein the core valve is threadedly disposed within the core carrier with an external surface of the core valve seated against an internal surface of the core carrier, thereby preventing fluid communication between the external surface of the core valve and the internal surface of the core carrier.

3. The valve assembly of claim 2, further comprising a seal disposed between the external surface of the core valve and the internal surface of the core carrier.

4. The valve assembly of claim 1, further comprising a core carrier seal disposed in a seal seat of the core carrier, wherein the seal seat of the core carrier is located at an external shoulder of the core carrier, and wherein the core carrier seal prevents fluid communication between the core carrier and an internal shoulder of the valve body when the core carrier is configured in the core carrier closed position.

5. The valve assembly of claim 1, further comprising a core valve seal disposed in a seal seat of the core pin, wherein the seal seat of the core pin is provided by a partially rolled flange formed about an enlarged portion of the core pin, and wherein the core valve seal prevents fluid communication through a central cavity of the core valve when the core pin is configured in the core pin closed position.

6. The valve assembly of claim 1, wherein the core carrier is biased toward the core carrier closed position by a biasing element acting against an external shoulder of the core carrier and a retaining ring disposed within a central bore of the valve body.

7. The valve assembly of claim 1, wherein the core pin is biased toward the core pin closed position by a biasing element acting against an enlarged portion of the core pin and an internal shoulder of the core valve body.

8. The valve assembly of claim 1, further comprising a cap located at an end of the core pin, the cap sized to prevent the core pin from fully entering the core valve body and adapted to be engaged by a pin of the chuck.

9. The valve assembly of claim 1, wherein the core pin is displaced from its first core pin closed position prior to the core carrier being displaced from its first core carrier closed position upon the valve assembly being seated in the chuck.

10. The valve assembly of claim 9, wherein the core carrier is returned to its first core carrier closed position prior to the core pin being returned to its first core pin closed position upon the valve assembly being removed from the chuck.

11. A container assembly for collecting a fluid sample, comprising:
    a container body having a closed first end and an open second end;
    a cap comprising a cup shape and further comprising an aperture adapted to receive a valve assembly, the cap affixed to the open second end of the container body;
    a valve assembly secured within the aperture of the cap, the valve assembly comprising:
        a valve body;
        a core carrier, wherein the core carrier is biased toward a core carrier closed position; and
        a core valve comprising a core valve body and a core pin, wherein the core pin is biased toward a core pin closed position;
        wherein the core carrier and the core pin are individually displaced from their closed positions upon the valve assembly being seated in a chuck, thereby allowing a fluid to flow through the valve assembly; and
    a dip tube secured to a mating portion of the core carrier.

12. The container assembly of claim 11, wherein the open second end of the container body comprises a rolled lip and the cap comprises a partially rolled flange, wherein the cap is affixed to the container body having an inner curved surface of the partially rolled flange in communication with an outer curved surface of the rolled lip.

13. The container assembly of claim 12, wherein a sealing element is disposed between the outer curved surface of the rolled lip and the inner curved surface of the partially rolled flange.

14. The container assembly of claim 13, wherein the partially rolled flange of the cap is pressed under the rolled lip of the container body, thereby forming an air or gas tight seal between the cap and the container body.

15. The container assembly of claim 13, wherein the cup shape of the cap defines one or more sides of the cap which are expanded to form a lip such that the lip of the cap applies pressure under the rolled lip of the container body, thereby forming an air or gas tight seal between the cap and the container body.

16. The container assembly of claim 11, wherein the valve body comprises a partially rolled flange providing a seat for a sealing element, and the valve assembly is secured to the cap having a seal disposed in the seat, thereby forming an air or gas tight seal between the valve assembly and the cap.

17. The container assembly of claim 11, wherein the dip tube is secured to the mating portion of the core carrier through a press-fit connection, a crimped connection, a threaded connection, a barbed connection, a swaged connection, or combinations thereof.

18. A method of collecting a fluid sample, comprising:
providing a container assembly for collecting a fluid sample, the container assembly comprising:
   a container body having a closed first end and an open second end;
   a cap comprising a cup shape and further comprising an aperture adapted to receive a valve assembly, the cap affixed to the open second end of the container body;
   a valve assembly secured within the aperture of the cap, the valve assembly comprising:
     a valve body;
     a core carrier, wherein the core carrier is biased toward a core carrier closed position; and
     a core valve comprising a core valve body and a core pin, wherein the core pin is biased toward a core pin closed position;
     wherein the core carrier and the core pin are individually displaced from their closed positions upon the valve assembly being seated in a chuck, thereby allowing a fluid to flow through the valve assembly; and
   a dip tube secured to a mating portion of the core carrier;
receiving the valve assembly in a chuck, the chuck comprising a chuck body formed to provide a valve seat and a mating projection, the chuck further comprising a chuck pin adapted to communicate with the core pin of the valve assembly; and
seating the valve assembly in the chuck, thereby allowing fluid communication between an interior volume of the container assembly and one or more outlet or inlet bores of the chuck body.

19. The method of claim 18, wherein the seating comprises a first intermediate seating position whereby the chuck pin engages a cap of the core pin, thereby causing the core pin to be displaced from the core pin closed position and further causing a seal of the core valve to become unseated from a body of the core valve.

20. The method of claim 19, wherein the seating comprises a second intermediate seating position whereby the mating projection of the chuck body engages an internal shoulder of the core carrier, thereby causing the core carrier to be displaced from the core carrier closed position and further causing a seal of the core carrier to become unseated from an internal shoulder of the valve body.

* * * * *